United States Patent
Lucas et al.

(10) Patent No.: US 6,546,113 B1
(45) Date of Patent: Apr. 8, 2003

(54) METHOD AND APPARATUS FOR VIDEO WATERMARKING

(75) Inventors: Keith Lucas, New Market (CA); William Van Rassel, Thorn Hill (CA)

(73) Assignee: Leitch Technology International Inc., Toronto (CA)

(*) Notice: Subject to any disclaimer, the term of this patent is extended or adjusted under 35 U.S.C. 154(b) by 0 days.

(21) Appl. No.: 09/260,510

(22) Filed: Mar. 2, 1999

(51) Int. Cl.[7] .................................................. G06K 9/00
(52) U.S. Cl. ...................................... 382/100; 713/176
(58) Field of Search ................................ 382/100, 232, 382/250; 713/176, 179; 380/210, 252, 287, 54; 348/461, 463

(56) References Cited

U.S. PATENT DOCUMENTS

| | | | |
|---|---|---|---|
| 3,796,868 A | | 3/1974 | Kaul et al. |
| 4,267,580 A | | 5/1981 | Bond et al. |
| 5,111,292 A | * | 5/1992 | Kuriacose et al. .......... 375/240 |
| 5,122,875 A | * | 6/1992 | Raychaudhuri ............. 348/390 |
| 5,613,004 A | | 3/1997 | Cooperman et al. |
| 5,689,587 A | | 11/1997 | Bender et al. |
| 5,768,426 A | | 6/1998 | Rhoads |
| 5,850,482 A | * | 12/1998 | Meany et al. ............... 382/232 |
| 6,131,161 A | * | 10/2000 | Linnartz ..................... 713/176 |
| 6,154,571 A | * | 11/2000 | Cox et al. ................... 382/250 |

OTHER PUBLICATIONS

"Steganography"; www.indstate.edu/msattler/sci–tech/comp/privacy/topics/steganography.html.
"Steganography Info and Archive"; members.iquest.net/~mrmil/stego.html.
"Digital Watermarking and Image Authentication"; www.c-tr.columbia.edu/—mars/papers/reports/water/doc.html.
"Look, It's Not There"; www.byte.com/art9701/sec/art1.htm.
"How to Embed a Watermark"; www.byte.com/art/9701/sec18/art1.htm.
"Steganography Overcomes Cryptography Restrictions"; www.byte.com/art/9701/sec18/art2.htm.
"Steganography"; patriot.net/~johnson/html/neil/stegdoc/stegdoc.html.

* cited by examiner

*Primary Examiner*—Leo Boudreau
*Assistant Examiner*—Abolfazl Tabatabai
(74) *Attorney, Agent, or Firm*—Banner & Witcoff, Ltd.

(57) ABSTRACT

Watermark data consisting of known two-dimensional codeword patterns are added to a first portion of each video frame by modifying parameters defining the first portion. Limited randomization of the spatial position of the codeword pattern is also provided. During a decoding process, a predictor continuously estimates the current value of the modified parameters. In one embodiment of the present invention, the predictor employs video samples taken from unmodified areas of the frame to provide the estimates. The estimated parameter values are subtracted from the actual parameter values to provide an error signal. Multiple correlators attempt to detect the presence of the codeword pattern in the error signal within a range of spatial locations surrounding a nominal position of the codeword pattern. The use of multiple correlators provides immunity to feasible attacks aimed at damaging or obscuring the watermark.

31 Claims, 3 Drawing Sheets

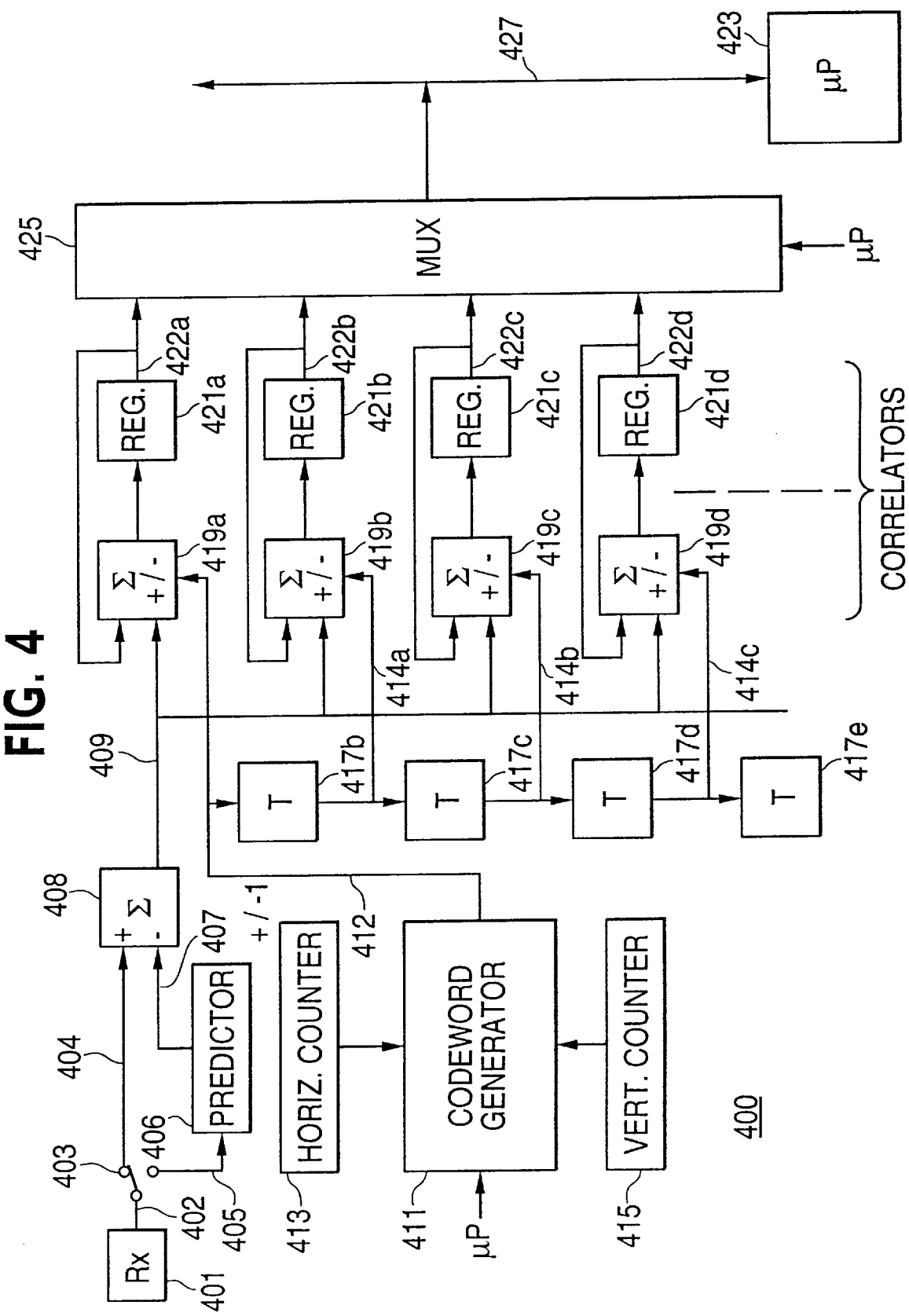

METHOD AND APPARATUS FOR VIDEO WATERMARKING

TECHNICAL FIELD

The present invention relates generally to steganography and, in particular, to techniques for embedding data in a video signal and for detecting the presence of such embedded data in a video signal.

BACKGROUND OF THE INVENTION

Steganographic techniques, as known in the art, generally attempt to hide one piece of information within another. Within the broad field of steganography, the ability to embed ancillary data in analog or digital data representing video or graphics has a number of uses. Such systems ideally hide authentication or other data in a data stream or store in such a way as to allow the data stream or store (for example a graphics file on a floppy disk or a video-tape) to function normally and without indicating the presence or absence of the embedded data. Toward the end of aiding in the identification of copyright infringement or source identification, technology that allows authentication data to be carried by the data itself is useful. Employing a video image or stream of images to serve as a "carrier" for embedded data is also useful for annotating and indexing the carrier data itself. An example, called digital watermarking, is a technique that modifies data representing a video image or stream of images in such a way that the modifications are essentially undetectable.

Various methods have been used in the past to "hide" digital information in a video signal. In many cases, the added data is associated with the video, but is not part of the video image itself. For example, in U.S. Pat. No. 5,737,026 issued Lu et. al., the added data is encoded in an overscan region of the video signal, and therefore can be removed without affecting the video images. Such systems are clearly unsuitable for copyright protection where the added data must be substantially indelible. In other cases, the watermark data is encoded into the video in such a simple manner that straightforward methods may be used to detect and remove the data thereby destroying the watermark. For example, the "fingerprint" apparatus of U.S. Pat. No. 5,668,603 issued to Copeland et al. communicates each bit by raising or lowering the video set-up by 0.5 IRE for a complete field.

In U.S. Pat. No. 3,984,624 issued to Waggener et al., data is added to the video signal in randomized positions, making the data difficult to remove. However, no attempt is made in this case to hide the video data from the viewer, and the digital signature therefore impairs the video to some degree. A method for hiding data in a video data stream is disclosed in U.S. Pat. No. 4,969,041 issued to O'Grady, et al. A low-level waveform is added to the video signal during the active video portion of the video signal. The low-level waveform can be any unique waveform, such as a set of random noise waveforms that are unlikely to occur in a normal video signal, each of which represents a unique digital data word. The low-level waveform to be embedded in the video signal has levels significantly below the noise level of the video signal. The low-level waveform is detected by correlating the video signal with all of the unique waveforms, or with a desired one of the unique waveforms if a particular data word is sought. The video signal is multiplied by each waveform, or with the desired waveform, and the result is compared with a threshold value to determine a correlation coefficient for each waveform. This technique, however, is vulnerable to attack in that the video image can be modified in such a way as to make the signal uncorrelatable with the standard waveforms. For example, an adverse party could zoom the video images to distort the embedded signal to the point that it is no longer recognizable without destroying the image.

While the foregoing discussion of prior art techniques does not represent an exhaustive review of the state of the prior art, it does point out the shortcomings of current techniques. In particular, a need exists for a simple technique for embedding data in a video signal that minimizes the impact on the quality of the video signal, that is substantially impervious to attempts to remove or obscure the embedded data, and that provides for straightforward detection of the embedded data.

SUMMARY OF INVENTION

These needs and others are substantially met by the present invention. Generally, the present invention provides a technique for embedding data (a "watermark") in a video signal. The watermark may be used to identify the source and/or the owner of the information in the video signal. The encoded video signal meets all broadcast and studio specifications, and has no visible impairments. Attempts to obscure or remove the embedded data by adding noise, coring, cropping or warping the image will damage the video to an unacceptable degree before the watermark is eliminated. The method is cascadable, and survives digital compression and/or conversion to analogue.

A low-level digital signal is added to a parameter defining the video signal. The watermark data consists of known two-dimensional codeword patterns that are added to portions of each video frame, and covering a large proportion of the frame. The portions can be, for example, alternate lines or alternate fields. The codeword patterns consist of relatively few bits per frame so that each bit of a codeword covers a significant portion of the frame. Therefore only low spatial frequencies are present in the codeword patterns. Limited randomization of the spatial position of the codeword pattern is also employed. By altering a polarity of a codeword pattern, binary data can be communicated on a per frame basis.

Detection of the codeword pattern is accomplished by a two step process. In the first step, a predictor is employed that continuously estimates the current value of the modified parameter. In one embodiment of the present invention, the predictor employs video samples taken from unmodified areas of the frame (areas to which no data has been added, e.g., alternate lines or fields) to provide the estimates. The estimated parameter values are then subtracted from the actual parameter values constituting the video signal, thereby producing a low-amplitude noise-like signal containing the embedded watermark data. In the second step, multiple correlators attempt to detect the presence of the codeword pattern in a range of spatial locations surrounding its nominal position in the image frame. The use of multiple detectors (spatially offset from the original codeword location) provides immunity to feasible attacks aimed at damaging the watermark, i.e., levels of zoom, cropping or warping of the signal (short of destroying the video signal) do not materially affect the delectability of the mark.

BRIEF DESCRIPTION OF THE DRAWINGS

FIG. 4 is a block diagram of an apparatus for detecting the presence of data embedded in a video signal in accordance with the present invention.

DETAILED DESCRIPTION OF THE PREFERRED EMBODIMENT

Figure 1:
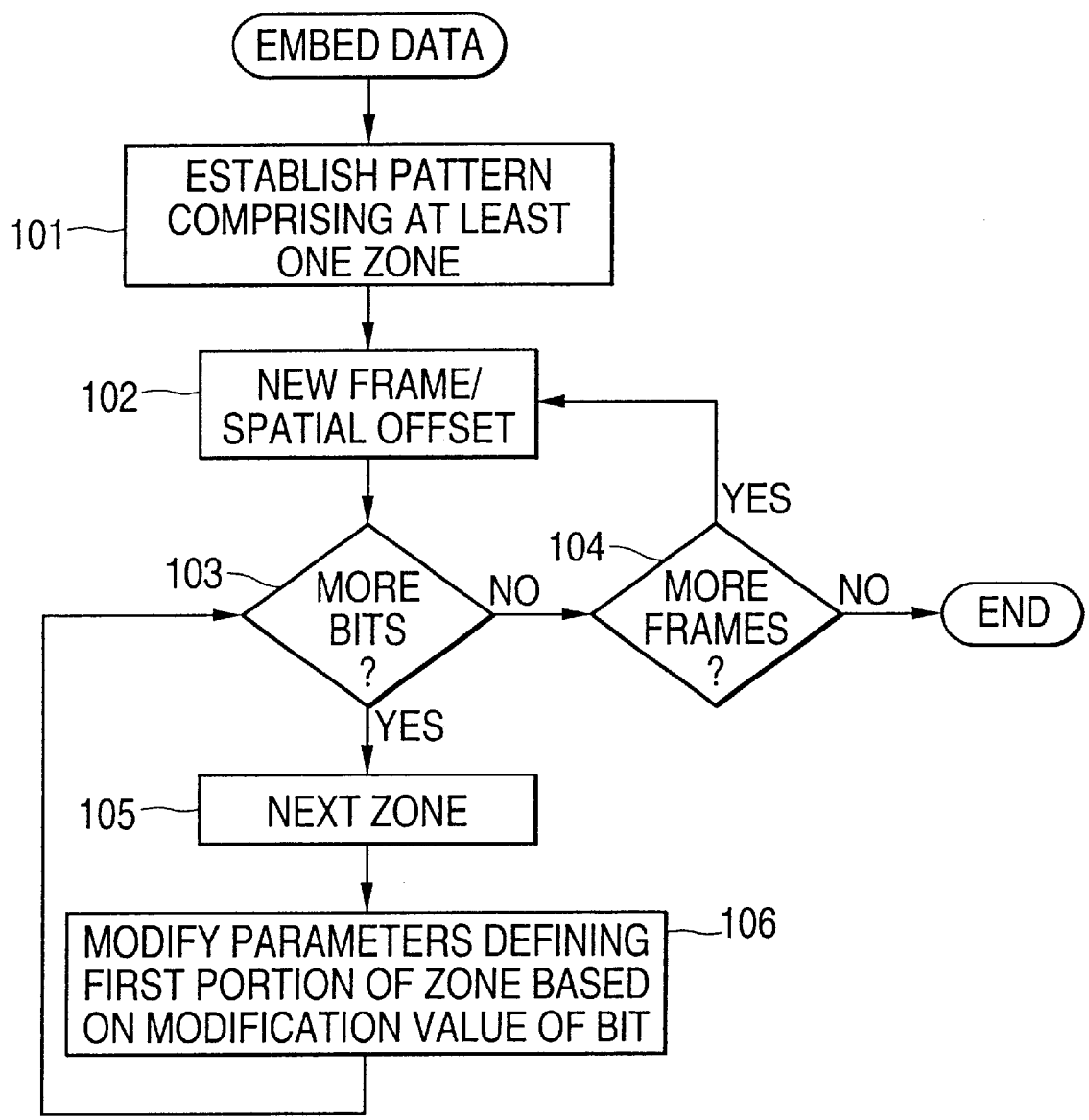
FIG. 1 is a flowchart illustrating a method for embedding data in a video signal in accordance with the present invention.

The present invention may be more fully described with reference to FIGS. 1–4. FIG. 1 illustrates a method whereby data can be embedded in a video signal. Preferably, the steps illustrated in FIG. 1 are implemented using a dedicated hardware platform. In one embodiment, it is anticipated that a customized integrated circuit could be used. Alternatively, given current capabilities, a microprocessor-based computer executing suitably adapted software to operate on stored digitally-represented video data could be used. Those having ordinary skill in the art will recognize that the method described in FIG. 1 could be easily implemented to accommodate various video formats (e.g., analog video). At step 101, a pattern representing a fixed-length codeword and comprising at least one zone is defined. Typically, the pattern will be defined prior to encoding the video to include the watermark. An exemplary pattern is illustrated in FIG. 2.

Figure 2:
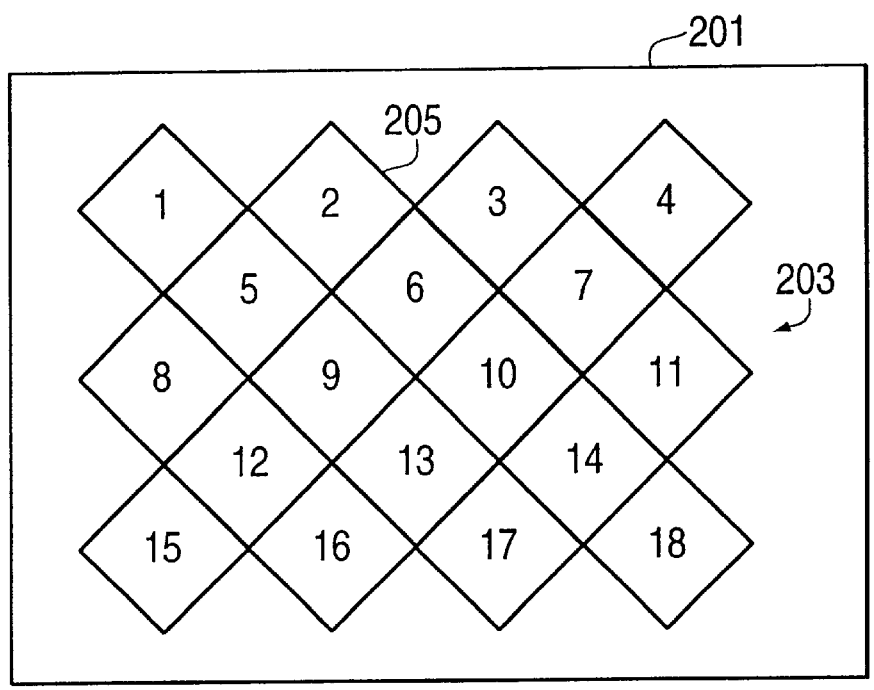
FIG. 2 illustrates a video frame in which a pattern comprising multiple zones has been established in accordance with the present invention.

In particular, FIG. 2 illustrates a video frame 201 in which a pattern 203 has been logically established. That is, in the context of the present invention, the pattern is never actually added to a video frame thereby altering the image provided by the frame, but is only established in a logical sense. The pattern 203 comprises multiple zones 205, in this case labeled 1 through 18. The pattern 203 corresponds to an 18-bit codeword, with each bit of the 18-bit codeword uniquely corresponding to one of the zones 205 defining the pattern 203. For example, the least significant bit of the codeword can correspond to the zone labeled 1, the most significant bit can correspond to the zone labeled 18, with those bits between the least significant and most significant bits corresponding to like-numbered zones. Of course, the length of a given codeword, and the particular correspondence between codeword bits and zones is a matter of design choice. It is anticipated that codewords will typically be in the range of 16–24 bits in length with each zone 205 covering a significant portion of the frame 201. The pattern 203 is assumed to have a nominal position within the frame such that spatially offset versions of the pattern 203 can be derived automatically, as discussed below.

Figure 3:
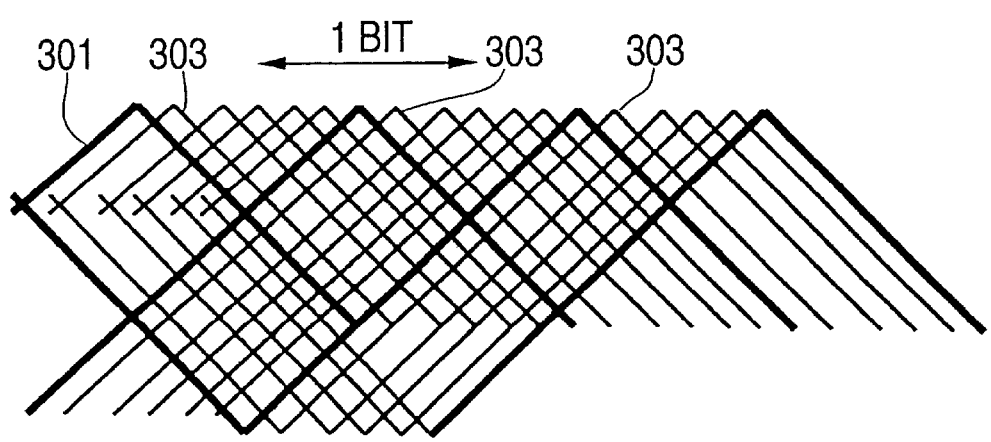
FIG. 3 illustrates the pattern of FIG. 2 after various horizontal offsets have been applied thereto.

Referring again to FIG. 1, at step 102, a new video frame is provided. Video frames are well known in the art and typically comprise enough video information to fill a standard display screen. At a minimum, the format of the video frames is such that data can be encoded into a component of the video frame, e.g., a luminance component, and be able to withstand conversions between formats. Also at step 102, a spacial offset for the pattern 203 is determined. FIG. 3 illustrates the effect of introducing various random horizontal offsets, limited in magnitude to one horizontal bit position, relative to a nominal position 301 for a given pattern. That is, assuming that the nominal position 301 may be defined by coordinates represented by fixed-length binary words, a one-bit difference from the nominal position 301 corresponds to a pattern having coordinates that differ in one bit position in the horizontal and/or vertical directions. For example, the spatially offset pattern identified by reference numeral 303 is shifted horizontally one bit position relative to the nominal position 301. Although not shown in FIG. 3, vertical offsets are likewise possible. The spacial offset determined at step 102 is relative to the nominally-positioned pattern 301. By randomly offsetting the pattern in this manner, the present invention offers protection against attempts to detect and remove the watermark based on a fixed-position pattern.

Referring again to FIG. 1, at step 103 it is determined whether any more bits constituting the codeword remain to be embedded in the current frame. If not, it is determined if there are any more frames to be processed at step 104. If no more frames need to be processed, the method ends. If more frames are to be processed, the method returns to step 102. Where bits remain to be embedded in the current frame (step 103), the corresponding zone is ascertained at step 105. Because the particular correspondence between zones and codeword bits is a matter of design choice, the zone ascertained at step 105 need not be contiguous with, or even close to, the previous zone. Regardless, at step 106, parameters defining a first portion of the zone are modified in accordance with a modification value of the bit. As contemplated by the present invention, each zone within a pattern is composed of at least two separate portions. In one embodiment, separate portions of a zone comprise alternate lines or fields, as known in the art, encompassed within the logical borders of that zone. For example, if a zone is divided into two separate portions, every other line within the borders of the zone could be defined as forming the first portion, and the remaining lines forming the second portion. Of course, other methods of defining such portions are readily determinable and are a matter of design choice. Regardless of the manner in which the respective portions of each zone are defined, the present invention embeds the codeword bits into the video signal by modifying parameters defining the first portion of each zone. For example, assuming that alternate lines are used within each zone, and that luminance parameters are being used to convey the watermark data, a "modification value" (described in further detail below) is added to each luminance parameter defining the alternate lines. In another embodiment, it is possible that the modification value could be added to the first portion of a zone (e.g., alternate lines) and subtracted from a second portion of the zone (remaining lines).

Preferably, the parameters modified at step 106 is at least one of a luminance and a chrominance parameter. Luminance and chrominance parameters with regard to video signals are well known in the art and will not be discussed in further detail here. These parameters are modified by adding a modification value corresponding to the bit to be embedded. For example, a bit having a high value (e.g., "1") will have a corresponding modification value of 0.25 IRE (Institute of Radio Engineers Scale unit; 140 IRE=1 volt p-p) and a bit having a low value (e.g., "0") will have a corresponding modification value of −0.25 IRE. The amplitude of the modification value is a matter of design choice, but is preferably chosen to be a very low level relative to "typical" video signal levels. Likewise, the polarity (+/−) assigned to high and low level bits can be varied according to the requirements of the system. It should be noted that codewords preferably comprise an equal number of high value and low value bits; for example, an 8-bit codeword of 11010100 is preferred over a codeword of 11011100. Steps 103 through 106 are repeated until all of the bits of a codeword have been embedded in their respective zones, thereby effectively embedding the entire codeword into the current frame.

It is further understood that separate values can be conveyed on a per frame basis by altering the polarity of the codeword. In this manner, successive frames can be used to convey a string of individual bits. For example, assume that an 8-bit codeword represented as 10110100 is to be added to each frame in a video signal. When a high bit value is to be conveyed in a given frame, the codeword 10110100 (positive polarity) is added to that frame. Conversely, when a low bit value is to be conveyed, the codeword 01001011 (negative polarity; complement of the positive polarity codeword) is added to the frame. Based on the present method for detecting codewords, discussed in further detail below, the polarity of the codeword detected within a frame will indicate the value of the bit conveyed in that frame.

Referring now to FIG. 4, there is shown a block diagram of a decoder 400 capable of detecting a watermark embedded in a video signal in accordance with the present invention. The functionality of the various components making up the decoder 400, as described below, may be implemented using a hardware and software techniques, or a combination thereof, known to those having ordinary skill in the art. A receiver 401 takes as input a video input signal and provides a frame 402 as output. Preferably, the output of the receiver 401 comprises the luminance or chrominance parameters (i.e., all parameters, both modified and unmodified, used in the conveyance of the watermark data) of the frame data 402. Assuming that a watermark has been embedded in the video signal, various segments of the frame data 402 should correspond to zones of the known pattern. A separator 403 is provided to direct a first portion 404 and a second portion 405 of the video signal along separate paths. As described above, the first portion 404 and the second portion 405 may comprise alternate lines or fields of the frame 402. The first portion 404 of each frame is presumed to be functioning as the "carrier" of embedded watermark data, if any, and the second portion of each frame is presumed to have been unmodified by any watermark encoding process. The second, or unmodified, portion 405 is directed to a predictor 406 as shown.

The predictor 406 takes as input the second portion 405 and provides an estimate 407 of parameters defining the first portion 404. The first portion 404 and the estimate 408 are provided to a subtractor 408 which calculates a difference between the first portion 404 and the estimate 407. For example, assume that the watermark encoding process modifies the luminance parameters corresponding to the first portion 404 of each zone. Further assume that the first and second portions of each zone correspond to alternate lines within each zone. Thus, the separator 403 will provide that data defining those lines that were not modified during the encoding process to the predictor, whereas the data defining those lines that were modified during the encoding process (the first portion) is provided directly to the subtractor. The predictor 406 calculates the estimate 407 of the data defining the modified lines based on the data defining the unmodified lines. In one embodiment of the present invention, this is accomplished by selecting, from the data defining the modified lines, a first datum having a unique spatial location relative to the overall frame, i.e., a single luminance data point corresponding to a given pixel in a given line. A second datum from the unmodified lines, being in closest proximity to the first datum, is also selected and output by the predictor as the estimate of the first datum, i.e., a second luminance data point corresponding to another pixel from a line adjacent to the given line and closest to the given pixel. This process is repeated for all of the data corresponding to first and second portions, i.e., alternate lines, within the frame data 402. The output of the subtractor 408, then, is a difference or error signal 409 comprising the embedded data, if any. It is understood that other, more sophisticated techniques could be used to provide the estimate 407.

Either at the request of an operator or automatically, a microprocessor 423 programs a codeword generator 411 with a known pattern signal (codeword). Based on the known pattern signal, the codeword generator 411 generate the codeword pattern 412 corresponding to a known starting position, which may or may not be equivalent to the nominal position of the codeword pattern. For example, assuming that the pattern 203 shown in FIG. 2 is located at its nominal position, and that such a pattern is being searched for in the video signal being analyzed in FIG. 4. In this case, the codeword pattern 412 would comprise data that is time-aligned with the error signal 409 to correspond to where one would expect watermark data to be embedded in the video signal based on the nominally positioned pattern 203. The alignment between the codeword pattern 412 and the error signal 409 is maintained by the horizontal and vertical counters 413, 415. Furthermore, delay elements 417 introduce vertical and horizontal delays to the codeword pattern 412 to produce a variety of spatially offset codeword patterns 414 relative to the known starting position. The codeword pattern 412 and spatially offset codeword patterns 414 are provided as one set of inputs to correlators, whereas the error signal 409 is provided as the other input to each of the correlators. In order to simplify the overall operation of the decoder 400, only the positive polarity version of the codeword pattern 412 is generated.

As shown, each correlator comprises a programmable adder/subtractor 419 and a register 421. Although four correlators are shown in FIG. 4, a larger or smaller number may be provided as required, preferably to match the number of possible spatially offset codeword patterns. Operating in accordance with well-known principles, the correlators compute correlations 422 that are subsequently stored in the registers 421 and provided as input to a multiplexer 425. At the end of each frame, as delineated by the frame data 402, the microprocessor 423 addresses the multiplexer 425 and reads the correlations 422 via a data bus 427. Each correlation 422 gauges the degree of similarity between a version of the known codeword pattern (nominally positioned or spatially offset) and the error signal 409.

Operating in accordance with stored software algorithms, the microprocessor 423 searches through all of the correlations 422 to select that correlation having the highest absolute value. The correlation having the highest absolute value will correspond to that version of the codeword pattern 412 that is most similar to the error signal 409. The selected correlation is then compared to a correlation threshold. For example, assuming that the absolute values of the correlations 422 are normalized between 0 (indicating perfectly uncorrelated signals) and 1 (indicating perfectly correlating signals), the correlation threshold could be set to 0.85. In this case, if the absolute value of the selected correlation falls below 0.85, it is assumed that the watermark was not present within the frame currently being analyzed. Conversely, if the absolute value off the selected correlation is above 0.85, indicating a relatively high degree of correlation, then the watermark is deemed to be present in the frame currently being analyzed. The sign (+/−) of the selected correlation will then indicated whether a codeword having a positive or negative polarity was embedded in the frame, thereby indicating the value of the single data bit conveyed in that frame. If the embedded watermark data is found in a certain proportion of frames, then the video signal is deemed to have the watermark embedded therein and the microprocessor can generate such an indication. Furthermore, those bits received on a frame basis can be further processed (decrypted, error corrected, etc.) as needed an presented to an operator of the decoder. For example, it is anticipated that the bits conveyed on a frame basis can carry information identifying a copyright owner of the content of the video signal, or similar information.

What has been described is merely illustrative of the application of the principles of the present invention. Other arrangements and methods can be implemented by those skilled in the art without departing from the spirit and scope of the present invention.

What is claimed is:

1. A method for embedding a watermark codeword having at least one bit in a video signal having at least one frame, the method comprising:
    establishing a pattern within a frame, the pattern having at least one zone uniquely corresponding to each codeword bit;
    establishing first and second portions of each zone, the first and second portions being defined by values of a parameter that vary throughout the frame; and
    modifying, for each zone for which the uniquely corresponding codeword bit has a first codeword bit value, values of the parameter defining the first portion so as to have a first relative difference with regard to values of the parameter defining the second portion.

2. A method for detecting a watermark embedded in a video signal having at least one frame, the watermark including a codeword having at least one bit, the method comprising:
    receiving a frame having a pattern established therein, the pattern having at least one zone uniquely corresponding to each codeword bit, each zone having first and second portions, the portions being defined by values of a parameter that vary throughout the frame;
    for each zone, estimating the parameter values defining the first portion of the zone based on the parameter values defining the second portion of the zone;
    for each zone, computing a difference between the estimated parameter values and the actual parameter values defining the first portion of the zone;
    computing a correlation between the differences and a known pattern signal; and
    establishing the presence of the watermark in the video signal when the correlation compares favorably with a correlation threshold.

3. The method of claim 2 wherein the watermark codeword comprises multiple bits and the frame comprises multiple zones, with each zone of the frame uniquely corresponding to one of the codeword bits.

4. The method of claims 3, further comprising:
    indicating that a low value has been received if the correlation is positive; and
    indicating that a high value has been received if the correlation is negative.

5. The method of claim 3, wherein the first and second portions comprise one of alternate lines and alternate fields.

6. The method of claim 3, wherein the parameter is at least one of a chrominance parameter and a luminance parameter.

7. The method of claim 3, said estimating further comprising:
    determining parameter values defining the second portion at points of closest proximity to points in the first portion for which the actual parameter values are determined.

8. The method of claim 3, further comprising computing correlations between the differences and spatially offset versions of the known pattern signal.

9. The method of claim 8, wherein the spatially offset versions of the known pattern signal are offset in at least one of a horizontal direction and a vertical direction.

10. The method of claim 8, further comprising:
    establishing that the watermark is not embedded in the video signal when none of the correlations compares favorably with the correlation threshold.

11. The method of claim 3, further comprising:
    indicating that a high value has been received if the correlation is positive; and
    indicating that a low value has been received if the correlation is negative.

12. The method of claim 2 wherein the video signal comprises multiple frames, with the pattern established within and substantially covering each of a plurality of the multiple frames, and wherein:
    said receiving comprises receiving the plurality of the multiple frames;
    said estimating and computing are carried out for each of the plurality of the multiple frames;
    said computing a difference further comprises computing an error signal based on differences between the estimated parameter values for the first portion of each zone and the actual parameter values defining the first portion of the zone;
    said computing a correlation comprises computing correlations between the error signal and spatially-diverse versions of the codeword; and
    said establishing the presence comprises establishing the presence of the watermark in the video signal when a first correlation of the correlations compares favorably with a correlation threshold.

13. An apparatus for detecting a watermark codeword having at least one bit in a video signal having at least one frame, the apparatus comprising:
    a receiver that takes the video signal as input and outputs at least one frame, wherein a pattern comprising at least one zone is defined within the frame, wherein a zone uniquely corresponds to each codeword bit, and wherein each zone has first and second portions defined by values of a parameter that vary throughout the frame;
    a predictor, coupled to the receiver, that for each zone estimates values of the parameter defining the first portion of the zone based on values of the parameter defining the second portion of the zone;
    a subtractor, coupled to the predictor and the receiver, that for each zone calculates a difference between the estimated parameter values and the actual values of the parameter defining the first portion of the zone;
    at least one correlator, coupled to the subtractor, that calculates at least one correlation between the differences and a known pattern signal; and
    a comparator, operably coupled to the at least one correlator, that establishes the presence of the watermark in the video signal when a first correlation of the at least one correlation compares favorably with a correlation threshold.

14. The apparatus of claim 13, further comprising:
    a separator, coupled to the receiver and the predictor, that provides only the second portion of each zone to the predictor.

15. The apparatus of claim 13, further comprising:

a pattern signal generator, coupled to the at least one correlator, that provides the known pattern signal.

16. The apparatus of claim 15, wherein the pattern signal generator generates spatially offset versions of the known pattern signal.

17. The apparatus of claim 13, wherein the predictor determines, at one or more points of closest proximity between a first portion of a zone and a second portion of the zone, a value of the parameter defining the second portion to produce an estimate of a value of the parameter defining the first portion of the zone.

18. The apparatus of claim 13 wherein the video signal comprises multiple frames, with the pattern defined within and substantially covers each of a plurality of the multiple frames, and wherein:

the receiver outputs the plurality of the multiple frames;

the predictor estimates, for each zone of each of the plurality of the multiple frames, values of the parameter defining the first portion of the zone based on values of the parameter defining the second portion of the zone;

the subtractor is configured to calculate an error signal based on differences between the estimated parameter values for the first portion of each zone and the actual parameter values defining the first portion of the zone;

the correlator is configured to calculate correlations between the error signal and spatially-diverse versions of the codeword; and the comparator is configured to establish the presence of the watermark in the video signal when a first correlation of the correlations compares favorably with a correlation threshold.

19. The apparatus of claim 18, further comprising:

a separator, coupled to the receiver and the predictor, that provides only the plurality of second portions of each frame of the plurality of frames to the predictor.

20. The apparatus of claim 18, further comprising:

a codeword generator, coupled to the at least one correlator, that provides the spatially-diverse versions of the codeword.

21. The apparatus of claim 18, wherein the predictor further comprises means for determining, at one or more points of closest proximity between a first portion of a zone and a second portion of the zone, a value of the parameter defining the second portion to produce an estimate of a value of the parameter defining the first portion of the zone.

22. The method of claim 1 wherein the watermark codeword comprises multiple bits and the frame comprises multiple zones, with each zone of the frame uniquely corresponding to one of the codeword bits.

23. The method of claim 22, wherein the video signal comprises multiple frames and the pattern is established within and substantially covers each of a plurality of the multiple frames.

24. The method of claim 23, said establishing the pattern further comprising:

for at least one of the plurality of multiple frames, establishing the pattern with a spatial offset relative to the pattern established in a previous frame.

25. The method of claim 24, wherein the spatial offset is at least one of a horizontal offset and a vertical offset.

26. The method of claim 23, further comprising:

conveying a first bit value for a first frame; and conveying a second bit value for a second frame by altering the codeword for the second frame by changing all high bits in the codeword to low bits and changing all low bits in the codeword to high bits.

27. The method of claim 22, wherein the first and second portions comprise one of alternate lines and alternate fields.

28. The method of claim 23, wherein the parameter is at least one of a chrominance parameter and a luminance parameter.

29. The method of claim 24, wherein the first codeword bit value is high and a second codeword bit value is low, and wherein modifying the parameter values further comprises:

adding a modification value to the parameter values defining a first portion when the codeword bit uniquely corresponding to the zone within which the first portion is located has the first codeword bit value, thereby yielding the first relative difference; and subtracting the modification value from the parameter values defining the first portion when the codeword bit uniquely corresponding to the zone within which the first portion is located has the second codeword bit value, thereby yielding a second relative difference.

30. The method of claim 22, wherein the codeword comprises an equal number of high value and low value bits.

31. The method of claims 22, wherein the first codeword bit value is high and a second codeword bit value is low, and wherein modifying the parameter values further comprises:

subtracting a modification value from the parameter values defining a first portion when the codeword bit uniquely corresponding to the zone within which the first portion is located has the first codeword bit value, thereby yielding the first relative difference; and adding the modification value to the parameter values defining the first portion when the codeword bit uniquely corresponding to the zone within which the first portion is located has the second codeword bit value, thereby yielding a second relative difference.

* * * * *

UNITED STATES PATENT AND TRADEMARK OFFICE
CERTIFICATE OF CORRECTION

PATENT NO.    : 6,546,113 B1  
DATED         : April 8, 2003  
INVENTOR(S)   : Keith Lucas and William Van Rassel Page 1 of 1

It is certified that error appears in the above-identified patent and that said Letters Patent is hereby corrected as shown below:

<u>Column 10,</u>  
Line 19, "23" has been replaced by -- 22 --.

Signed and Sealed this

Second Day of September, 2003

JAMES E. ROGAN  
*Director of the United States Patent and Trademark Office*